(12) United States Patent
Varekamp

(10) Patent No.: US 12,067,691 B2
(45) Date of Patent: Aug. 20, 2024

(54) DISPARITY ESTIMATION FROM A WIDE ANGLE IMAGE

(71) Applicant: KONINKLIJKE PHILIPS N.V., Eindhoven (NL)

(72) Inventor: Christiaan Varekamp, Veldhoven (NL)

(73) Assignee: Koninklijke Philips N.V., Eindhoven (NL)

( * ) Notice: Subject to any disclaimer, the term of this patent is extended or adjusted under 35 U.S.C. 154(b) by 581 days.

(21) Appl. No.: 17/291,046

(22) PCT Filed: Nov. 4, 2019

(86) PCT No.: PCT/EP2019/080110
§ 371 (c)(1),
(2) Date: May 4, 2021

(87) PCT Pub. No.: WO2020/094575
PCT Pub. Date: May 14, 2020

(65) Prior Publication Data
US 2021/0407037 A1 Dec. 30, 2021

(30) Foreign Application Priority Data
Nov. 6, 2018 (EP) ..................... 18204567

(51) Int. Cl.
*G06T 3/00* (2024.01)
*G06T 3/047* (2024.01)
*G06T 7/593* (2017.01)

(52) U.S. Cl.
CPC .............. *G06T 3/047* (2024.01); *G06T 7/593* (2017.01); *G06T 2207/20068* (2013.01); *G06T 2207/20228* (2013.01)

(58) Field of Classification Search
CPC ................... G06T 3/0018; G06T 7/593; G06T 2207/20068; G06T 2207/20228; G06T 2207/20021; G06T 7/97
See application file for complete search history.

(56) References Cited

U.S. PATENT DOCUMENTS

| 2008/0129723 | A1  | 6/2008 | Comer et al. |
| 2010/0119172 | A1* | 5/2010 | Yu ........................... G06T 5/006 382/256 |
| 2019/0089940 | A1* | 3/2019 | Zhang .................... G06T 3/4038 |

OTHER PUBLICATIONS

Eichenseer et al, Disparity estimation for fisheye images with an application to intermediate view synthesis, IEEE 19th International Workshop on Multimedia Signal Processing (MMSP) (pp. 1-6) (Year: 2017).*

(Continued)

*Primary Examiner* — Ping Y Hsieh
*Assistant Examiner* — Xiao Liu

(57) ABSTRACT

An apparatus where a vertical image position of the scene point may depend on the horizontal image position. A mapper generates a modified image having a modified projection by applying a mapping to the first wide angle image corresponding to a mapping from the first projection to a perspective projection followed by a non-linear vertical mapping from the perspective projection to a modified vertical projection of the modified projection and a non-linear horizontal mapping from the perspective projection to a modified horizontal projection of the modified projection. Then a disparity estimator generates disparities for the modified image relative to a second image and representing a different view point than the first wide angle image.

20 Claims, 8 Drawing Sheets

(56) References Cited

OTHER PUBLICATIONS

Shah et al, Depth estimation using stereo fish-eye lenses, Proceedings of 1st International Conference on Image Processing (vol. 2, pp. 740-744 vol. 2) (Year: 1994).*

Lang et al, Nonlinear Disparity Mapping for Stereoscopic 3D. ACM Transactions on Graphics (Proc. SIGGRAPH), Jul. (Year: 2010).*

Masoud Samadi et al "Using Fish Eye Stereo Vision System for Autonomous Vehicles" 2017 11th Asian Control Conference IEEE, Dec. 17, 2017 p. 1331-1334.

Shah et al "Depth Estimation Using Stereo Fish-Eye Lens" Proceedings of the International Conf. on Image Processing, Austin TX Nov. 13-16, 1994 vol. 2, p. 740-744.

Eichenseer et al "Disparity Estimation for Fish Eye Images With an Application to Intermediate View Synthesis" 2017 IEEE 19th International Workshop on Multimedia Signal Processing, Oct. 16, 2017 p. 1-6.

Abraham et al "Fish-Eye-Stereo Calibration and Epipolar Rectification" ISPRS Journal of Photogrammetry and Remote Sensing vol. 59, No. 5, Aug. 1, 2005 p. 278-288.

Hane et al "Real Time Direct Dense Matching on Fisheye Images Using Plane-Sweeping Stereo" 2014 Second International Conf. on 3D Vision.

International Search Report and Written Opinion from PCT/EP2019/080110 mailed May 14, 2020.

* cited by examiner

DISPARITY ESTIMATION FROM A WIDE ANGLE IMAGE

CROSS-REFERENCE TO PRIOR APPLICATIONS

This application is the U.S. National Phase application under 35 U.S.C. § 371 of International Application No. PCT/EP2019/080110, filed on Nov. 4, 2019, which claims the benefit of EP Patent Application No. EP 18204567.4, filed on Nov. 6, 2018. These applications are hereby incorporated by reference herein.

FIELD OF THE INVENTION

The invention relates to disparity estimation based on one, and typically a plurality of, wide angle images, and in particular, but not exclusively, to disparity estimation from images captured using a fish eye camera lens.

BACKGROUND OF THE INVENTION

The variety and range of image and video applications have increased substantially in recent years with new services and ways of utilizing and consuming video being continuously developed and introduced.

For example, one service being increasingly popular is the provision of image sequences in such a way that the viewer is able to actively and dynamically interact with the system to change parameters of the rendering. A very appealing feature in many applications is the ability to change the effective viewing position and viewing direction (the viewing pose) of the viewer, such as for example allowing the viewer to move and "look around" in the scene being presented.

Such a feature can specifically enable a virtual reality experience being provided to a user. This may allow the user to (relatively) freely move about in a virtual environment and dynamically change his position and where he is looking. Typically, such virtual reality applications are based on a three-dimensional model of the scene with the model being dynamically evaluated to provide the specific requested view. This approach is well known from e.g. game applications for computers and consoles, such as in the game category of first person shooters.

It is also desirable, in particular for virtual reality applications, that the image being presented is a three-dimensional image. Indeed, in order to optimize immersion of the viewer, it is typically preferred for the user to experience the presented scene as a three-dimensional scene. Indeed, a virtual reality experience should preferably allow a user to select his/her own position, camera viewpoint, and moment in time relative to a virtual world.

A major issue in supporting various services based on, in particular three dimensional, representations of a scene is that a large amount of data is required. This results in high resource requirements, such as a need for large storage resources. However, in many scenarios, the biggest constraint is not storage or processing requirements but communication requirements. If it is required that the data representing the scene must be communicated over a bandwidth limited communication channel (whether internal or external), it is highly desirable to try to reduce the amount of data that needs to be communicated.

A particular issue for many new content services is that they have substantially increased requirements for the capture of the scene on which the content provision is based. For example, for a virtual reality service, such as specifically a free viewpoint video service, it is required that the scene is captured from different positions and orientations in order to generate data allowing view images to be generated for different view poses that are typically unknown at the time of capture.

In many systems, this is achieved using a relatively large number of cameras at different positions and pointed in different directions in order to get a more complete capture of the scene. In order to reduce the number of separate cameras/captures and images required, it is often desirable to capture the scene using wide angle cameras, and often extreme wide angle cameras, such as cameras employing fish eye lenses. However, such wide angle lenses tend to introduce substantial distortion and tends to result in a distorted projection of the real three dimensional scene onto the image. This substantially complicates or degrades many operations. In particular, it substantially hinders or complicates disparity and depth estimation based on comparing two images from different viewpoints.

Hence, an improved approach for determining disparity information would be advantageous. In particular, an approach that allows improved operation, facilitated operation, improved representation of a scene, increased flexibility, facilitated implementation, facilitated operation, improved and/or facilitated disparity estimation especially for wide angle captures, and/or improved performance would be advantageous.

SUMMARY OF THE INVENTION

Accordingly, the Invention seeks to preferably mitigate, alleviate or eliminate one or more of the above mentioned disadvantages singly or in any combination.

According to an aspect of the invention there is provided apparatus comprising: a receiver for receiving a first wide angle image, the first wide angle image having a viewing angle of at least 90° and a first projection where a vertical image position of a scene position depends on a horizontal distance from the scene position to an optical axis for the wide angle image; a mapper for applying a mapping to the first wide angle image to generate a modified image having a modified projection, the mapping providing a vertical mapping function matching a mapping from the first projection to a perspective projection followed by a non-linear vertical mapping from the perspective projection to a modified vertical projection of the modified projection and a horizontal mapping function matching a mapping from the first projection to the perspective projection followed by a non-linear horizontal mapping from the perspective projection to a modified horizontal projection of the modified projection; a disparity estimator for generating a set of disparities for the modified image relative to a second image representing a different view point than the first wide angle image; and a disparity mapper for generating a further set of disparities for the first wide angle image by mapping the further set of disparities to the first projection by applying an inverse mapping of the mapping applied to the first wide angle image.

The invention may provide an improved and/or facilitated disparity estimation for and based on a wide angle image in many embodiments and scenarios. It may typically provide improved disparity estimation from wide angle image images without requiring these to be converted into large images with very high resolutions (i.e. with exceedingly large pixel counts) and may provide disparity values that directly relate to the wide angle images. The approach may allow improved disparity estimation while maintaining a relatively low resolution for a large viewing angle. The approach may typically provide improved disparity estimation without requiring a disparity search algorithm that explicitly takes into account the fish-eye image projection in the search procedure. The latter would require a re-design of most of the many disparity estimation algorithms that are in use today and that use a horizontal line based scan for matching.

The approach may in many cases allow horizontal disparity estimation to be used and may remove or reduce a requirement for a two-dimensional disparity search despite the first wide angle image having e.g. co-dependency between the horizontal and vertical image position for a given scene position/point.

The approach may in many embodiments allow reuse of existing disparity estimation algorithms and routines developed for narrow angle images.

The approach may in many scenarios allow lower complexity and resource usage for the disparity estimation. For example, it may in many embodiments allow line based disparity estimation to be used.

The approach may allow independent and different mapping in the vertical and horizontal direction. The non-linear mappings may be optimized for the specific requirements for the horizontal and vertical direction. For example, the horizontal mapping may be optimized considering a horizontal disparity estimation whereas the vertical mapping may be optimized without considering disparity estimation. Different mapping functions may be used in the horizontal and vertical directions with the individual mapping functions potentially being optimized for the individual properties and requirements for the two directions. The vertical and horizontal mapping functions may be different and may be individually optimized.

A scene position may be a position in a three dimensional scene represented by the first wide angle image. It may also be referred to as a world space position as often used in the field.

The vertical image position of a scene position depends on a horizontal distance in the sense that the vertical image position may depend on the horizontal image position (and possibly vice versa).

In some embodiments, the non-linear vertical mapping comprises a mapping in opposite directions for at least some positions in the first wide angle image having a same vertical value and different horizontal values.

A projection for an image may represent a projection/mapping of scene points onto the image or equivalently onto an image sensor capturing the image or a view port corresponding to the image. Typically, practical projections depend on the characteristics of the lens involved in capturing the image, but it will be appreciated that a projection may represent any projection/mapping of scene points onto an image whether such a projection in practice can be implemented by a lens or not (or indeed whether it can be practically implemented at all). A projection may be considered to correspond to any possible mapping from scene points to an image and may often be described as a mathematical formula (although it is not a requirement that it is, or even can be, described in this way). A vertical projection may be the projection in a vertical direction of the image (for constant horizontal position) and a horizontal projection may be the projection in a horizontal direction (for constant vertical position).

A mapping may be from one image to another, and specifically the mapping may be from one set of planar image coordinates to another set of planar image coordinates. The first wide angle image and the modified image may be planar images. The mapping may be from an image plane of the first wide angle image to an image plane of the modified image.

Any image representing a scene inherently represents a projection of the scene onto the image. A spatial distortion of an image (e.g. mapping image positions from input positions to different output positions) result in a modified projection.

The mapper may be arranged to generate the modified image by mapping image positions in the first wide angle image to image positions in the modified image. Such mapping results in a change in the projection from the first wide angle image to the modified image.

The non-linear vertical mapping and the non-linear horizontal mapping may together form a mapping for which the output vertical position depends only on the input vertical position and the output horizontal position depends only on the input horizontal position. The non-linear vertical mapping may map vertical image position coordinates to vertical image position coordinates. The non-linear horizontal mapping may map horizontal image position coordinates to horizontal image position coordinates.

In accordance with an optional feature of the invention, a mapping function of the non-linear vertical mapping is different from a mapping function of the non-linear horizontal mapping.

The approach may allow improved and/or more efficient operation in many embodiments. The difference in the mapping functions of the non-linear mappings results in the horizontal and vertical mapping functions being different.

In accordance with an optional feature of the invention, the mapping function of the non-linear vertical mapping is more compressed than the mapping function of the non-linear horizontal mapping.

This may provide improved performance in many embodiments and may specifically in many scenarios allow a smaller modified image (e.g. in terms of resolution or pixel count) to be generated which however still allows accurate disparity estimation.

In some embodiments, the non-linear vertical mapping may be more compressed than the non-linear horizontal mapping in the sense that the same range of pixels and/or viewing angle maps to a smaller range of pixels and/or viewing angle for the vertical direction than for the horizontal direction.

In some embodiments, the non-linear vertical mapping may be more compressed than the non-linear horizontal mapping in the sense that the gradient for the non-linear vertical mapping is smaller than the non-linear horizontal mapping for the same (vertical and horizontal respectively) offset from an image center of the wide angle image.

In accordance with an optional feature of the invention, the second image represents the modified projection.

This may allow improved and/or more efficient operation in many embodiments. The disparity estimation may be based on two images having the same projection of the scene onto the sensor/image/view port.

In accordance with an optional feature of the invention, the apparatus further comprises a depth estimator arranged to determine a set of depths for the modified image in response to the set of disparities and the non-linear horizontal mapping.

The approach may allow an efficient and/or high performance estimation of depth for an image.

In accordance with an optional feature of the invention, the mapper is arranged to apply the mapping by applying a first mapping to the first wide angle image to generate an intermediate image having the perspective projection and applying a second mapping to the intermediate image to generate the modified image.

In accordance with an optional feature of the invention, the mapper is arranged to perform rectification for the first wide angle image as part of the first mapping.

The rectification may include a distortion compensation, The distortion compensation may be a compensation for distortions of the first projection relative to a generic model for the first projection. The distortion compensation may be a compensation for distortions of a camera having captured the first wide angle image.

In some embodiments, the apparatus further comprises a renderer for synthesizing a synthesized image from the first wide angle image and disparities determined from the set of disparities for the modified image.

The approach may in many embodiments allow improved synthesis of images. The synthesis may be based on the original wide angle image, i.e. an image without degradation and artefacts that may be introduced by the mapping. The synthesized image may be for a different viewpoint than the viewpoint of the first wide angle image and viewpoint of the second image.

In some embodiments, the renderer is arranged to synthesize a synthesized image from the first wide angle image and the set of disparities for the first wide angle image.

In accordance with an optional feature of the invention, the mapper is arranged to divide the first wide angle image into a plurality of image sections and to perform the mapping by applying a sub-mapping to each image section, the sub-mapping for at least two of the plurality of image sections being different.

This may be particularly advantageous in many embodiments. For example, it may facilitate parallel processing thereby potentially substantially reducing processing delay. The approach of determining disparity estimates for a wide angle image may be particularly suited for parallel processing.

In accordance with an optional feature of the invention, the mapper is arranged to perform stereo rectification as part of the mapping, the stereo rectification being relative to a second wide angle image.

This may provide improved and/or facilitated operation.

In accordance with an optional feature of the invention, the receiver is arranged to receive a second wide angle image, the second wide angle image being for a different view point than the first wide angle image and having a viewing angle of at least 90° and the first projection; and the mapper is arranged to generate the second image by applying the mapping to the second wide angle image.

In accordance with an optional feature of the invention, a scene position having different magnitudes of horizontal offset with respect to optical axes for the first wide angle image and the second wide angle image are projected to different vertical positions in the first wide angle image and the second wide angle image.

In accordance with an optional feature of the invention, the mapping maps the different vertical positions in the first wide angle image and second wide angle image to a same vertical position in the modified image and the second image.

In accordance with an optional feature of the invention, the non-linear horizontal mapping has a gradient that decreases with an increasing horizontal distance to a center of the first wide angle image.

This may provide improved and/or facilitated operation.

The mapping may for a given position in the first wide angle image determine a position in the modified image. The non-linear horizontal mapping may decrease the change in horizontal image position in the modified image the further the horizontal distance to the center of the first wide angle image is.

The gradient may be determined as the difference (delta) in horizontal image position in the modified image divided by the difference (delta) in horizontal image position in an image corresponding to the first wide angle image mapped to the perspective projection.

In some embodiments, the non-linear vertical mapping has a gradient that decreases with an increasing vertical distance to a center of the first wide angle image.

The mapping may for a given position in the first wide angle image determine a position in the modified image. The non-linear vertical mapping may decrease the change in vertical image position in the modified image the further the vertical distance to the center of the first wide angle image is.

The gradient may be determined as the difference (delta) in vertical image position in the modified image divided by the difference (delta) in vertical image position in an image corresponding to the first wide angle image mapped to the perspective projection.

The further the position is from the center of the first wide angle image and the closer it is to the edge of the first wide angle image, the smaller the change in image position in the modified image may be for a given change in image position for an image corresponding to the first wide angle image mapped to a perspective view.

According to an aspect of the invention there is provided a method of estimating disparity, the method comprising: receiving a first wide angle image, the first wide angle image having a viewing angle of at least 90° and a first projection where a vertical image position of a scene position depends on a horizontal distance from the scene position to an optical axis for the wide angle image; applying a mapping to the first wide angle image to generate a modified image having a modified projection, the mapping providing a vertical mapping function matching a mapping from the first projection to a perspective projection followed by a non-linear vertical mapping from the perspective projection to a modified vertical projection of the modified projection and a horizontal mapping function matching a mapping from the first projection to the perspective projection followed by a non-linear horizontal mapping from the perspective projection to a modified horizontal projection of the modified projection; generating a set of disparities for the modified image relative to a second image and representing a different view point than the first wide angle image; and generating a further set of disparities for the first wide angle image by mapping the further set of disparities to the first projection by applying an inverse mapping of the mapping applied to the first wide angle image.

These and other aspects, features and advantages of the invention will be apparent from and elucidated with reference to the embodiment(s) described hereinafter.

BRIEF DESCRIPTION OF THE DRAWINGS

Embodiments of the invention will be described, by way of example only, with reference to the drawings, in which.

DETAILED DESCRIPTION OF THE EMBODIMENTS

The following description focuses on embodiments of the invention applicable to image processing and disparity/depth estimation suitable for e.g. virtual reality or 3D video applications. However, it will be appreciated that the invention is not limited to this application but may be applied in e.g. many different image processing and rendering applications.

In many such embodiments, a scene may be captured from a plurality of different capture poses. In the field, the terms placement or a pose is used as a common term for position and/or direction/orientation and the combination of the position and direction/orientation of e.g. an object, a camera, or a view is indeed typically referred to as a pose or placement.

In many embodiments, a scene may be captured simultaneously from a plurality of different capture poses using a plurality of cameras or e.g. using a stereo camera simultaneously capturing two offset images. In some static scenes, images may be captured sequentially by a single camera by moving it between the different capture poses.

In order to characterize a three-dimensional scene, depth information is desirable in addition to the visual information and in many embodiments, depth information is derived by disparity estimation between corresponding images (e.g. at the same time for dynamic scenes) viewing the scene from different viewpoints. Such disparity estimation is typically based on identifying disparities between the view directions from the capture poses to the same scene object. This is typically achieved by a process of finding corresponding matching image regions/segments/objects in the images from different capture poses and determining the shift in image position between these corresponding image parts in the different images.

In many practical applications, such as for example virtual reality applications, it is desirable to capture large sections of the scene. In order to do so, it is particularly practical in many applications to use wide angle cameras, and specifically to use fish eye lens cameras. Such cameras typically have a viewing angle of at least 90°, in many cases including up to 180° or even more.

Such cameras however tend to introduce a substantial distortion when capturing an image. Indeed, whereas all cameras may tend to introduce some distortion resulting from projection of the scene onto the image plane, this distortion is often relatively small or insignificant for narrower angle cameras. In contrast, it is often quite substantial for wide angle cameras.

Conventional narrower angle cameras may introduce some (lens) distortion due to the projection of the scene onto the image plane, but this distortion is typically minor and may be corrected by a transform or mapping being applied to the image to convert this to e.g. an undistorted perspective projection.

Figure 1:
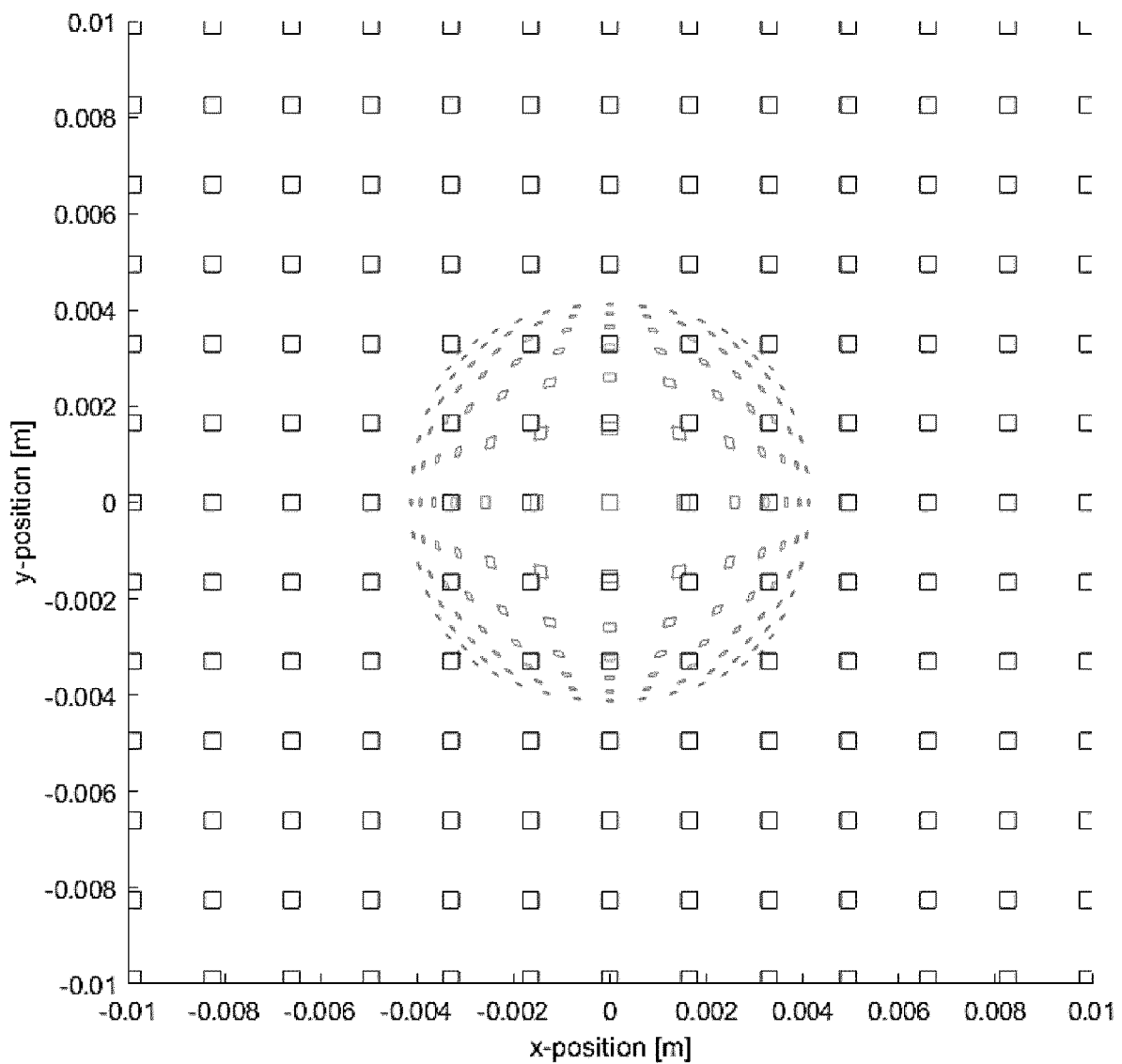
FIG. 1 illustrates an example of different image projections.

However, the distortion for wide angle images and cameras is often extreme. This may be exemplified by the example of FIG. 1 which shows an image generated by a wide angle camera of a regular equidistant grid of small identical squares. FIG. 1 illustrates both the capture of a regular pattern of identical squares by a perspective camera as well as the image captured by a wide angle camera. As illustrated, the projection of the pattern onto the image/sensor plane by the wide angle lens results in a substantial distortion affecting both the size and shape of the grid and the rectangles.

As can be seen, a very substantial distortion is present. The distortion is a consequence of the wide angle lens and is a trade-off resulting from the desire to capture a large part of the scene in a single image. Further, the distortion introduces a dependence between the horizontal and vertical positions. The vertical image position of a given scene point depends not only on the vertical position of the scene point but also on the horizontal position, i.e. it depends on the horizontal distance between the optical axis of the camera and the scene point. Thus, in the captured wide angle image, the vertical and horizontal positions are not independent.

The Inventor has realized that this substantially increased distortion is problematic for determining depth information by disparity estimation and typically results in a substantially decreased performance including inaccurate or unreliable estimation. For example, state-of-the-art disparity estimators perform horizontal matching which will result in inaccuracies in estimated disparities towards the edges of the images. It also means that derived depth estimates from these wrong disparities will be unreliable.

Another critical issue is that the wide angle projection results in horizontal lines in the scene being projected into lines in the image which are not horizontal in the image (as can be seen in FIG. 1, a horizontal row of squares is converted into an arched (in the vertical direction) row of distorted squares. Most disparity estimation algorithms are based on determining image horizontal disparities as these conventionally correspond to scene horizontal disparities, thereby reflecting the disparities between a human's eyes which are oriented horizontally. However, as this is not longer a valid assumption for the wide angle images, existing disparity estimation techniques cannot be used. This is not only impractical in terms of hindering backwards compatibility and reuse of existing algorithms thereby requiring new algorithms to be developed, but also results in the requirement that disparity estimation must be fully two-dimensional disparity estimation algorithms which substantially increase the complexity and resource usage. It also typically results in degraded performance as the constraint assumption that disparities are only horizontal is no longer valid. Specifically, the feature prevents existing line based disparity estimation algorithms to be used.

The Inventor has also realized that simply transforming the image into an intermediate image having a perspective projection (corresponding to the approach suitable for narrow angle images) is typically not practical as it requires exceedingly large image sizes (very high resolutions/pixel counts).

Mapping a wide angle image to a perspective projection while maintaining the resolution in the image center results in a very large image requiring very high resolution. For example, a typical sensor may have a size of 4000 pixels horizontally by 3000 pixels vertically and an un-distorted perspective projection image resulting from a wide angle image from such a sensor may typically require a resolution of at least 12000 by 9000 pixels. Such large images tend to be impractical. In contrast, a typical current disparity estimator (software/hardware) may be designed for an input image resolution of 1920 pixel horizontally and 1080 pixels vertically. Such large images tend to be impractical and have excessive resource demands. For example, they are not suitable for most existing disparity estimation algorithms as they will have too high resource requirements. For example, for a horizontal field of view of 160-degree, an undistorted perspective image can be three times the size (in both dimensions) compared to the original wide angle image. This means that the pixel count increases with a factor of more than nine. The cost of disparity estimation therefore also increases substantially.

Figure 2:
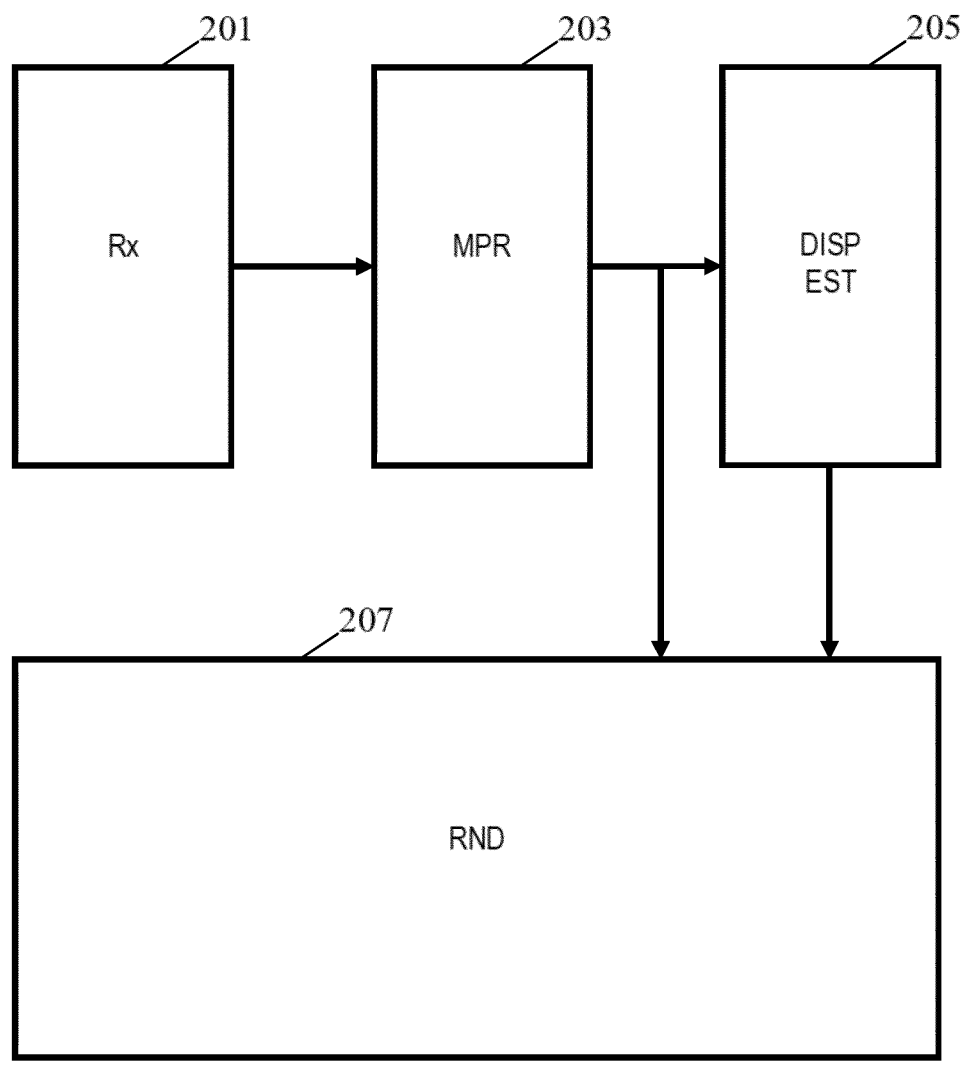
FIG. 2 illustrates an example of elements of an apparatus for generating disparity estimates in accordance with some embodiments of the invention.

FIG. 2 illustrates an example of an apparatus for disparity estimation from wide angle cameras. The apparatus follows an approach, and specifically utilizes a mapping, that the Inventor has realized may address some of the problems indicated above. In particular, it may in many applications allow reuse of existing disparity estimation algorithms and avoid the requirement for exceedingly large images.

The apparatus comprises a receiver 201 which is arranged to receive at least one wide angle image on which disparity estimation is to be performed. Typically, the receiver 201 may be arranged to receive a plurality of wide angle images corresponding to different capture positions with the disparity estimation being based on finding disparities between the different images. However, it will be appreciated that in some embodiments, a single wide angle image may be received and disparity estimation may be based on this in comparison with e.g. a narrower angle image captured from another capture position.

The wide angle image specifically corresponds to a viewing angle of at least 90° in at least one direction, and typically in the horizontal direction. The wide angle capture results in the image representing a projection of the scene onto the image plane that has a relatively high amount of distortion as previously explained. Further, the projection is such that a vertical image position of a world space position depends on a horizontal distance from the world space position to an optical axis for the image. The optical axis for the lens may for instance be defined as the line along which the light changes least in direction.

A scene point that coincides with the optical axis will typically be projected to or near the center of the image. The camera has an inherent orientation with respect to the sensor and accordingly has an orientation which corresponds to the horizontal direction in the scene being captured. Typically, a camera is physically arranged to have an orientation that is intended to align with the horizontal direction in the scene by being positioned such that the directions line up.

It will be appreciated that the terms horizontal and vertical are common terms in the field and are typically used to denote orthogonal directions for an image and image sensor. For a rectangular image and image sensor, one direction (the direction of two parallel edges) is known as the horizontal direction and the other direction (the direction of the other two parallel edges) is known as the vertical direction, In nominal use, the image sensor is arranged such that the horizontal direction corresponds to the horizontal direction in the scene/world which is being captured and the vertical direction corresponds to the vertical direction in the scene/world which is being captured.

With respect to a captured image, this accordingly has a horizontal and vertical direction. The image is typically an array of pixels arranged in a regular grid or matrix with the horizontal image direction corresponding to the rows of the grid/matrix and the vertical direction corresponding to the columns of the grid/matrix. This wide angle image is generated from a capture by a sensor and thus the sensor has a horizontal direction and a vertical direction. Typically, the camera is arranged such that when capture is performed, the horizontal direction of the sensor is aligned with the horizontal direction in the scene space and the vertical direction of the sensor is aligned with the vertical direction in the scene space.

For a conventional narrow angle image, the projection of the scene space onto the sensor is such that the two directions are substantially independent in the sense that the position in the image (and equivalently the projection point of the sensor) for a scene point (i.e. a point in the scene space) is independently given from the corresponding directions in the scene. Thus, the horizontal image/sensor position is determined by the horizontal position of the scene point (with respect to the optical axis) and is independent of the vertical position of the scene point (with respect to the optical axis). Similarly, the vertical image/sensor position is determined by the vertical position of the scene point (with respect to the optical axis) and is independent of the horizontal position of the scene point (with respect to the optical axis). Thus, for narrow angle images, the horizontal image position for a given point in the scene depends on the position of that point along an axis parallel to the horizontal direction of the image sensor. Similarly, the vertical image position for a given point in the scene depends on the position of that point along an axis parallel to the vertical direction of the image sensor.

However, for the wide angle image received by the receiver 201 this is no longer the case. Specifically, the vertical position of a scene point in the image depends not only on the vertical position of the scene point but also on the horizontal position of the scene point. Thus, for a given scene point. the vertical position will be different dependent on whether the scene point is captured towards the center (in the horizontal direction) or towards the edges of the image.

In other words, the scene is projected onto the image sensor such that the vertical projection position of a given point in the scene depends not only on the vertical position of the scene point (i.e. the position in the scene in a direction parallel to the vertical direction of the image sensor). Rather, the vertical position depends also on the horizontal position. Thus, a rotation of the camera around a vertical axis of the sensor (i.e. without changing the sensor position in the vertical direction) would result in a given scene point not only changing the horizontal image position but also the vertical image position.

Thus, for a wide angle camera such as a fish eye lens camera, the vertical and horizontal image positions are not independent but specifically the vertical image position depends on the horizontal image position.

It is noted that this effect can clearly be seen in the example of FIG. 2 which clearly shows how the horizontal line of squares are projected into an arc of distorted squares with the vertical position increasingly deviating from the center as you move towards the edge of the image.

In many scenarios, the dependency on the horizontal position may be substantial. For example, the dependency/projection may be such that a difference from the center to an edge of the wide angle image in the vertical position for a same vertical scene position may exceed 1% of the vertical image size. A vertical shift of 1% is already problematic since this would correspond to 1% of an image height of 1080 for example which amounts to roughly 10 pixels. A disparity estimator that uses horizontal matching only can already suffer performance when the vertical shift between the left and right image of a stereo pair is more than just one pixel.

In the example, the scene pattern is projected onto an almost circular pattern with the distances between the squares, as well as the size of the squares, reducing substantially the further the distance to the optical axis of the camera/image represented by the center of the image.

The receiver 201 is coupled to a mapper 203 which is arranged to map/transform the wide angle image into a modified image which corresponds to a different projection of the scene/world onto the image. The modified image may specifically be generated to correspond/represent the same viewport as the wide angle image but representing a different projection of the scene onto the image/view port/image sensor.

The mapper 203 is coupled to a disparity estimator 205 which receives the modified image as well as at least one other image which represents a capture of the scene from a different viewpoint. The disparity estimator 205 is arranged to perform disparity estimation to generate a set of disparities for the modified image relative to the second image. The disparity estimator 205 may accordingly generate disparity information indicative of the depth of the different image objects.

The disparity estimator 205 may for example perform disparity estimation by finding corresponding image objects/points in the two images and determining the disparity as the (possibly horizontal only) distance between the positions of these in the two images.

In the example, the apparatus further comprises a renderer 207 which is arranged to synthesize images for different viewpoints. For example, the renderer 207 may synthesize an image from a view pose that differs from the captured viewpoints/poses based on the modified image and the determined set of disparities. Such a processing may for example apply view shifting algorithms as are known to the skilled person.

In the apparatus of FIG. 2, the mapper 203 is arranged to transform the wide angle image representing a first projection of the scene onto the image (and equivalently onto the sensor/viewport/image plane) into a modified image which represents an underlying second and different projection of the scene onto the image (and equivalently onto the sensor/viewport/image plane). The mapping of the mapper 203 is performed by mapping positions in the wide angle image into positions in the modified image. The image value at a given position in the wide angle image may accordingly be mapped to provide the image value at a mapped position in the modified image (the image value may be a direct pixel value in the wide angle image or the modified image or may e.g. be an interpolated value in either the wide angle image or the modified image for a position that does not align with the pixel positions). The mapping may accordingly map image positions in the wide angle image to image positions in the modified image. The mapping may be a spatial mapping providing a position in the modified image as a function of a position in the wide angle image, or vice versa. The modified image may be generated using a one-to-one mapping function between positions in the wide angle image to positions in the modified image. A mapping function may be a function providing a position in the wide angle image from a position in the modified image, and/or a function providing a position in the modified image from a position in the wide angle image, with one function being the inverse of the other function.

The mapping is implemented using a horizontal mapping function and a vertical mapping function. Each of these may be a one-to-one function and may map in either direction (i.e. from the wide angle image to the modified image, or vice versa) with typically the mapping in the reverse direction being represented by the inverse function.

The mapping between the wide angle image and the modified image is accordingly a mapping between two images (for the same viewport) having different projections from the scene to the image/viewport/sensor.

The mapper 203 is arranged to generate the modified image such that it has a modified projection which corresponds to a mapping from the first projection to a perspective projection followed by a non-linear vertical mapping from the perspective projection to a modified vertical projection of the modified projection and a non-linear horizontal mapping from the perspective projection to a modified horizontal projection of the modified projection. The mapping may provide two mapping functions, namely a vertical mapping function and a horizontal mapping function. These functions may be different and may typically be optimized for the preferences and requirements of the two directions.

The vertical mapping function matches the function resulting from a mapping from the first projection to a perspective projection followed by a non-linear vertical mapping from the perspective projection to a modified vertical projection of the modified projection. The horizontal mapping function matches the function resulting from a mapping from the first projection to the perspective projection followed by a non-linear horizontal mapping from the perspective projection to a modified horizontal projection of the modified projection.

The mapper 203 may perform an operation where it first maps the modified image to an intermediate image which has a perspective projection. The perspective projection is characterized by a simple projection equation where the horizontal image coordinate is proportional to the horizontal scene coordinate divided by the scene depth and the vertical image coordinate is proportional to the vertical scene coordinate divided by the scene depth. Typically, a left and right fisheye image are transformed at the same time to two new perspective virtual view-points where undistortion and rotation of the camera heads is performed such that the resulting stereo pair is vertically aligned and stereo matching can be done line by line. This first mapping may be a two-dimensional mapping that is performed in a single operation to implement the first part of the horizontal and vertical mapping functions.

The mapper 203 may then apply non-linear mappings to the intermediate image where the non-linear mapping in the horizontal and the vertical direction may be identical or may be different. This results in an overall mapping which is individual and typically different for the two directions, i.e. a vertical mapping function and a horizontal mapping function is achieved. The approach may allow individual optimization of the mappings in the horizontal and vertical directions.

The non-linear mappings may be such that the distance between equidistant points in the perspective projection decrease with the distance to the center of the image (specifically corresponding to the optical axis). Thus, the non-linear mappings are such that a compression of distances in the intermediate image are increasingly compressed the further from the center of the image, i.e. compression increases towards the edges of the image. The non-linear mappings may thus be such that the gradient of the mapping of positions in the wide angle image to positions in the modified image decreases the closer the position is to the edge of the image and the further from the center of the image (with the distance being a horizontal or vertical distance for the non-linear horizontal mapping and the non-linear vertical mapping respectively).

The mapper 203 may thus apply a spatial image transform which transforms a wide angle image into a modified image which has a different underlying projection by applying a mapping that corresponds to the sequence of:

1. a first mapping/transfer to a perspective projection; and
2. a second non-linear mapping which specifically may be different in the horizontal and vertical directions and which is separate in the horizontal and vertical direction such that the vertical output position depends only on the vertical input position and the horizontal output position depends only on the horizontal input position (thus providing the property that the second mapping does not introduce vertical disparities between the rectified stereo pair of images).

This may result in a modified image which is a transformed version of the original wide angle image but with the property that the dependency of the vertical position on the horizontal position may be removed and with a projection that may represent a variable effective resolution. This variable resolution may further be controlled to provide an optimal trade-off between resolution and image size, and it may furthermore be individually optimized in the horizontal and vertical directions.

A particular advantage of the described approach is that it may allow a very efficient disparity estimation. Specifically, the approach may generate a modified image in which the disparity estimation needs only consider horizontal disparities, and thus the search for matching image sections can be limited to horizontal searches. Indeed, the approach may even allow line based disparity estimation. Further, the modified image can be generated such that it is kept to a manageable size yet provide a reasonable resolution. For example, the resolution in the center of the image can be maintained to be the same as the resolution of the wide angle image while at the same time reducing the resolution towards the edge of the image to provide a desired trade-off between image size and required precision of the disparity estimation at the edge of the image.

An advantage of the approach is that the non-linear mappings may be individually optimized in the vertical and horizontal directions. This may allow the horizontal mapping to be optimized for the disparity estimation in order to allow an efficient horizontal matching and estimation. As the disparity estimation may be based on only considering the horizontal disparities, the vertical non-linear mapping may be optimized without considering these aspects of the disparity estimation.

Thus, in many embodiments, different mapping functions may be used in the horizontal and vertical directions, i.e. the vertical and horizontal mapping functions may be different. Specifically, the relationship between distances to a central point in the modified image and distances to the central point in the wide angle image may be different in the horizontal and vertical directions.

A particular advantage of the approach is that it may in many embodiments allow an existing disparity estimation algorithm to be used. For example, many disparity estimation algorithms have been developed for narrow angle images (e.g. with a perspective projection) and the modified image generated by the described mapping may in many cases be used with such existing disparity estimation techniques.

In the previous example, the mapping/transform from the wide angle image to the modified image is by a two stage process first generating an intermediate image and then generating the modified image. This may for example be done by generating a large intermediate image that corresponds to a perspective projection (and e.g. without reducing image center resolution) and then mapping this to a smaller modified image. However, in many embodiments, the mapping/transform may be done in a single operation directly mapping the wide angle image into the modified image using a single combined mapping between positions of the wide angle image and positions in the modified image. For example, for each pixel position in the modified image, a predetermined position mapping representing the projection transform may provide a position in the wide angle image. The image value at this position (e.g. generated by suitable interpolation of neighboring pixel values) may then be applied to this pixel in the modified image.

Thus, rather than implement the vertical and horizontal mapping functions as two step functions comprising first a mapping to a perspective projection followed by a non-linear mapping, a mapping function may be implemented by a direct one step function that matches the mapping that results from first mapping the wide angle projection into the perspective projection followed by a second non-linear mapping.

As mentioned, the disparity estimation is performed between the modified image and a second image which represents the scene from a different viewpoint. It is possible for the second image to be generated through another process, for example it may be a narrow angle image of the scene (or a combined image formed by a plurality of narrow angle images). In this case, the narrow angle image will typically be mapped to the same projection as the modified image in order to facilitate disparity estimation. Thus, typically (but not necessarily always) the modified image and the second image being used for disparity estimation will employ the same projections from the scene to the images.

In most embodiments, the second image will be generated in the same way as the modified image, i.e. the disparity estimation will be based on at least a first and a second modified image both employing the second/modified projection resulting from the mapping of a wide angle image by a mapping that corresponds to a sequential mapping of the image to a perspective projection followed by individual horizontal and vertical mappings.

Thus, in some embodiments, the receiver 201 may further receive a second wide angle image which also has a viewing angle of at least 90° and the same projection as the first image. The mapper 203 may perform the same operation on this image thereby generating a first and second modified image on which disparity estimation can be performed.

It should be noted that in such an example, the same scene point/position is typically captured by the cameras at different offsets with respect to the optical axis and center of the images. Due to the wide angle effect, the scene point/ position will accordingly be at different horizontal positions in the two wide angle images. As a consequence, the vertical positions of the same scene point in the two wide angle images will typically be different. However, the mapping to the modified images will be different for the scene point such that the vertical positions in the two modified images corresponding to the same scene point are identical, i.e. they are mapped to the same vertical position but different horizontal positions in the two modified images. The difference between the horizontal positions can be determined by the disparity estimator 205 to provide a disparity value for the position in the first modified image corresponding to the scene point.

As a practical example, calibration tools from the well known OpenCV library can be used to determine a first mapping that will transform two input fisheye images to an undistorted stereo rectified image pair each following a perspective projection. The stereo rectification aligns the optical axis by applying a suitable rotation to each of the input fisheye coordinate systems. The current approach may then introduce a second mapping that transforms a non-linear mapping on this output. The equations for both mappings can be combined to construct a single combined mapping. This mapping may be stored in a remap table. Optionally, the inverse of this mapping may also be stored for later back-mapping of the disparity/depth to the fisheye coordinate systems.

In the following, a specific example will be described to elucidate the approach. In the example, perspective projection will be considered which maps horizontal angle to a scene point to a position on the sensor using the relation:

$$r = f \tan(\theta) \quad (1)$$

where $\theta$ is the horizontal (or in principle vertical) off-optical-axis angle [radian], f is the lens focal length [m], and r is the distance [m] from the optical centre of the sensor to the projected point.

In contrast, a wide angle lens, such as a fish-eye lens, may e.g. result in a constant angular resolution. For instance, an f-theta fisheye lens may result in the projection of:

$$r = f\theta \quad (2)$$

where the resolution is equal for all angles. Such a fisheye lens is thus very attractive for virtual reality applications where one wants to look around in all directions and have a constant image resolution in all directions. FIG. 1 illustrates an example of the resulting image when capturing a grid of squares using a camera with such a lens.

Figure 3:
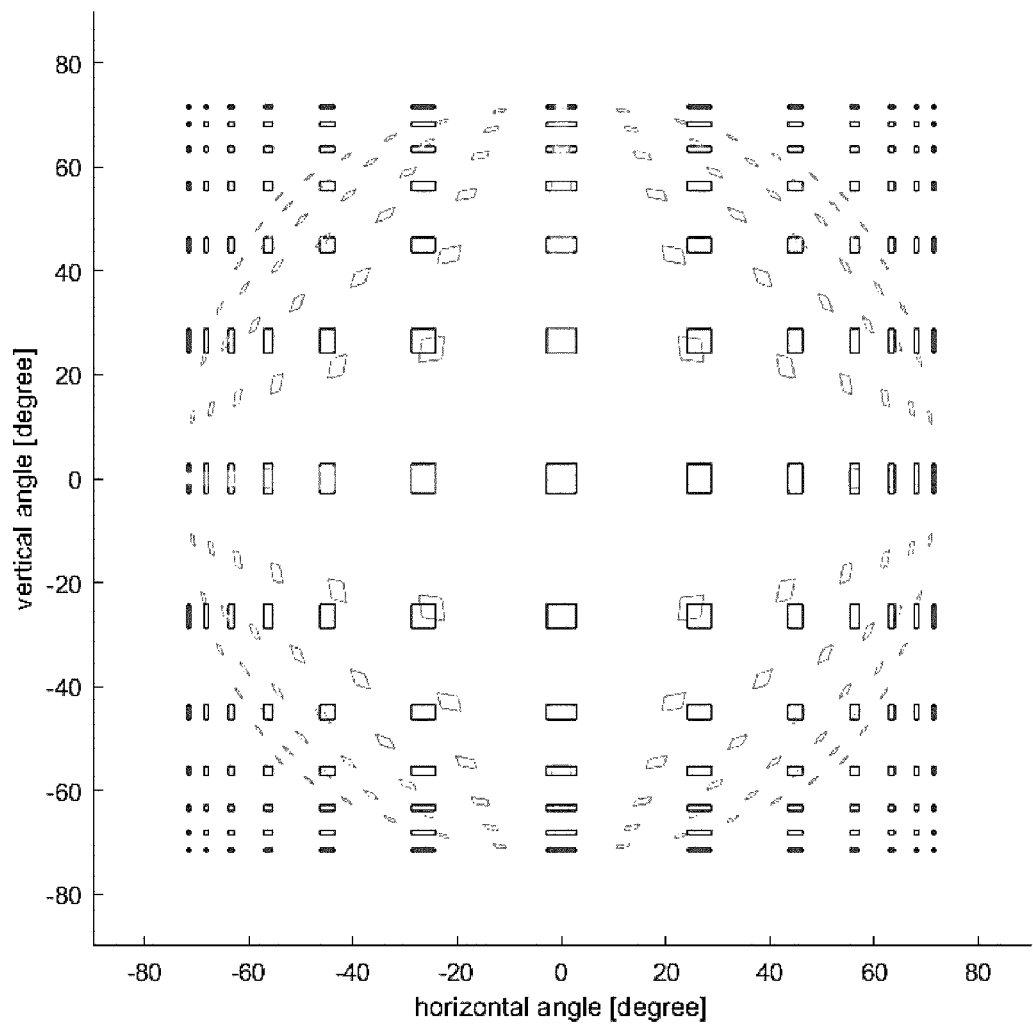
FIG. 3 illustrates an example of different image projections.

The image may be provided to the receiver 201 and fed to the mapper 203 which maps it into a modified image. An example of the modified image is illustrated in FIG. 3 which shows both the first wide angle image as well as the transformed modified image. As can be seen, the mapping is such that the modified image maintains the original horizontal positions, i.e. each row of squares is represented in the modified image as a horizontal line of rectangles. Further, the non-linear mappings result in distortion in the vertical and horizontal direction such that distances are increasingly compressed towards the edges of the image. However, the compression/distortion may be optimized for the specific intended purpose, and is not given by the properties of the lens or the wide angle image. The transform may cover the same sensor area as the original fisheye image. As can be seen the transform also results in a scaling/distortion of the squares.

To describe a specific example of the mapping/transform performed by the mapper 203 (u, v) may denote the image coordinates in the captured fisheye image, i.e. in the received wide angle image. Starting from equation (2), the off-axis angle can be derived as:

$$\theta = \frac{r_{fisheye}}{f} \quad (3)$$

Inserting this in equation (1) gives the un-distorted radius:

$$r_{perspective} = f \tan\left(\frac{r_{fisheye}}{f}\right). \quad (4)$$

The first mapping (to a perspective projection) for a single wide angle image now follows as:

$$u_{perspective} = \sin(\varphi) = f \tan\left(\frac{r_{fisheye}}{f}\right) \sin(\varphi) \quad (5)$$

$$v_{perspective} = \cos(\varphi) = f \tan\left(\frac{r_{fisheye}}{f}\right) \cos(\varphi) \quad (6)$$

where $\varphi = \text{atan } 2(v,u)$.

The transform may then apply a second mapping but separately for u and v, i.e. it may be individually in the horizontal and vertical direction, by first solving (1) for $\theta$ and then inserting $\theta$ in (2). After also inserting (5) and (6) we obtain:

$$u_{trans} = f\tan^{-1}\left(\frac{u_{perspective}}{f}\right) = f\tan^{-1}\left(\tan\left(\frac{r_{fisheye}}{f}\right)\sin(a\tan2(v,u))\right) \quad (7)$$

$$v_{trans} = f\tan^{-1}\left(\frac{v_{perspective}}{f}\right) = f\tan^{-1}\left(\tan\left(\frac{r_{fisheye}}{f}\right)\cos(a\tan2(v,u))\right) \quad (8)$$

This allows the image position in the modified image for a given position in the wide angle image to be determined.

In many embodiments, the mapper 203 may also be arranged to perform stereo rectification as part of the mapping. The stereo rectification is provided with respect to another wide angle image which is typically generated by a different camera. Specifically, the mapper 203 may include stereo rectification for a stereo camera setup which is used to generate the two images used in the disparity estimation. Stereo rectification is an operation that is used to perform an aligned stereo pair and therefore performs a rotation of axis on each of the 3D coordinate systems of the input images. It may also apply a sensor shift for each input camera image. It will be appreciated that different algorithms and approaches for stereo rectification are known and that any suitable approach may be used by the mapper 203.

The result of this approach may be a first mapping to a perspective projection/view that compensates for both distortion and stereo rectification.

Let $M \equiv (M_u(u, v), M_v(u, v))$ be the resulting mapping that creates the perspective coordinates as the following functions:

$$u_{perspective} = M_u(u,v) \quad (9)$$

$$v_{perspective} = M_v(u,v) \quad (10)$$

For a pair of calibrated wide angle image cameras, we can now perform the proposed transform as:

$$u_{trans} = f \tan^{-1}\left(\frac{u_{perspective}}{f}\right) \quad (11)$$

$$v_{trans} = f \tan^{-1}\left(\frac{v_{perspective}}{f}\right) \quad (12)$$

The total transform can now be stored in a new map M'. Thus, a single mapping corresponding to the combined first and second mapping (a mapping to a perspective projection and then to a modified non-linear projection) can be used to directly map from the input wide angle image to the modified image. This modified image may then be particularly suitable for disparity estimation and specifically may in many embodiments allow the use of standard, line based, disparity estimation.

A particular advantage of the approach is that it may allow a different mapping in the horizontal and vertical directions. In many embodiments, the non-linear vertical mapping is accordingly different from the non-linear horizontal mapping, i.e. different mapping functions may be used in the horizontal and vertical directions.

Specifically, in many embodiments, the non-linear vertical mapping may be more compressed than the non-linear horizontal mapping. For example, the gradient of the mapping function of the mapper 203 in the horizontal direction may be lower than the gradient of the mapping function of the mapper 203 in the vertical direction. Further, the gradient may decrease with increasing distance to the center of the wide angle image.

Figure 4:
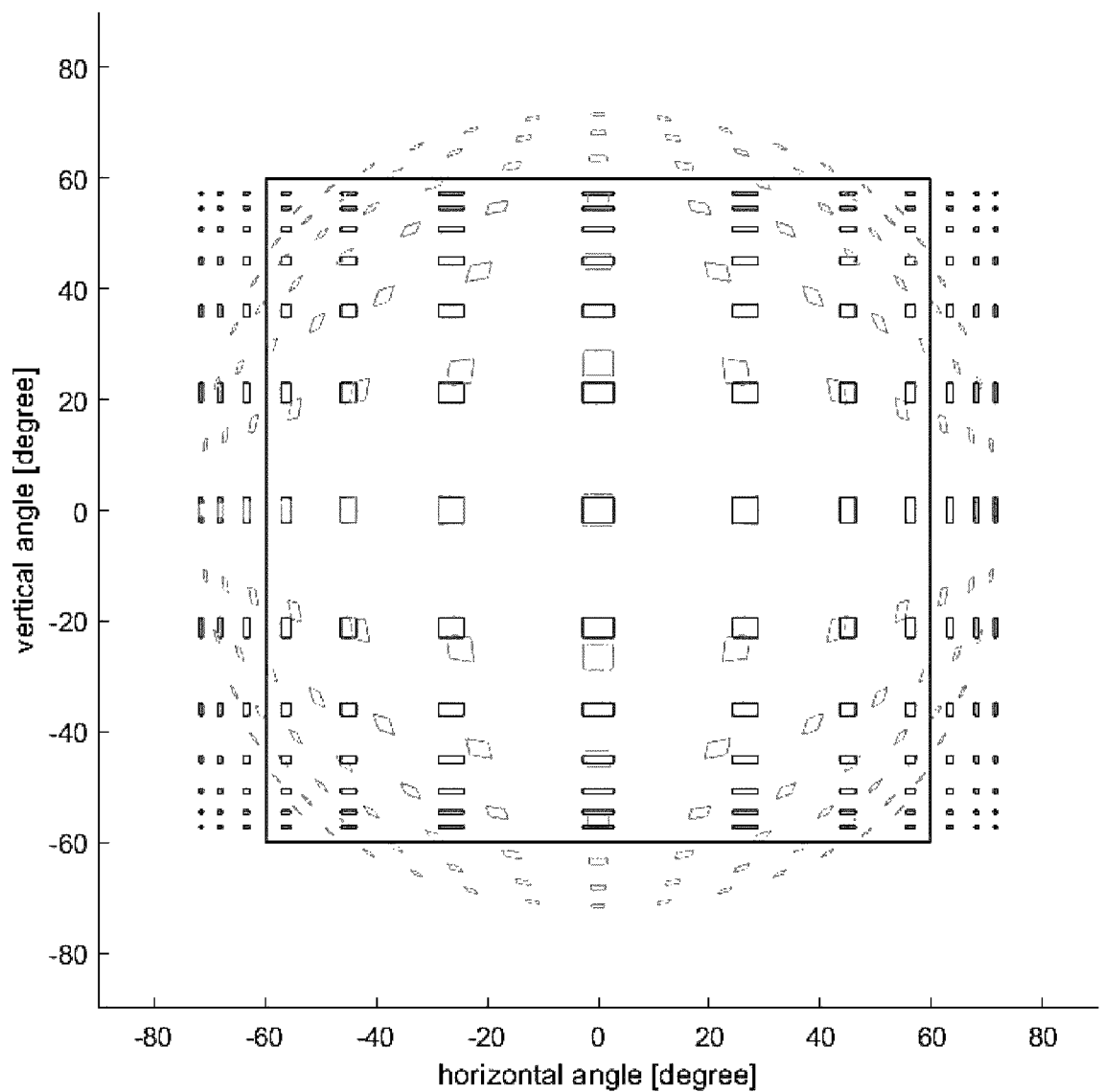
FIG. 4 illustrates an example of different image projections.

An example of such an approach is illustrated in FIG. 4. In this example, a square wide angle image is mapped to a modified image which has a larger extension in the horizontal direction, i.e. the square wide angle image is mapped to a modified image which is wider than it is high (it will be appreciated that the illustrated square image may correspond to a square section of an image). Thus, in this example, for a given offset (vertical or horizontal) with respect to the center of the wide angle image, the gradient of the mapping is lower for the horizontal mapping than for the vertical mapping.

Such an approach may for example facilitate or improve the horizontal disparity estimation while reducing the overall image size. It may also in many embodiments facilitate hardware implementation by reducing the complexity and resource requirements.

As a specific example, different focal lengths may be selected for the vertical and horizontal directions in the above specific example:

$$u_{trans} = f_u \tan^{-n}\left(\frac{u_{perspective}}{f_{fisheye}}\right) \quad (13)$$

$$v_{trans} = f_v \tan^{-1}\left(\frac{v_{perspective}}{f_{fisheye}}\right). \quad (14)$$

For instance, setting $f_u=1$ and $f_v=0.8$ will result in the example of FIG. 4.

In the previous description, disparity values are determined for the modified images, and the modified images and the determined disparity values are subsequently used to synthesize images for different viewpoints.

In some embodiments, the apparatus may include functionality for mapping the disparity values to disparity values for the wide angle image, i.e. to disparities which relate to the input wide angle projection rather than the modified projection of the modified image.

Figure 5:
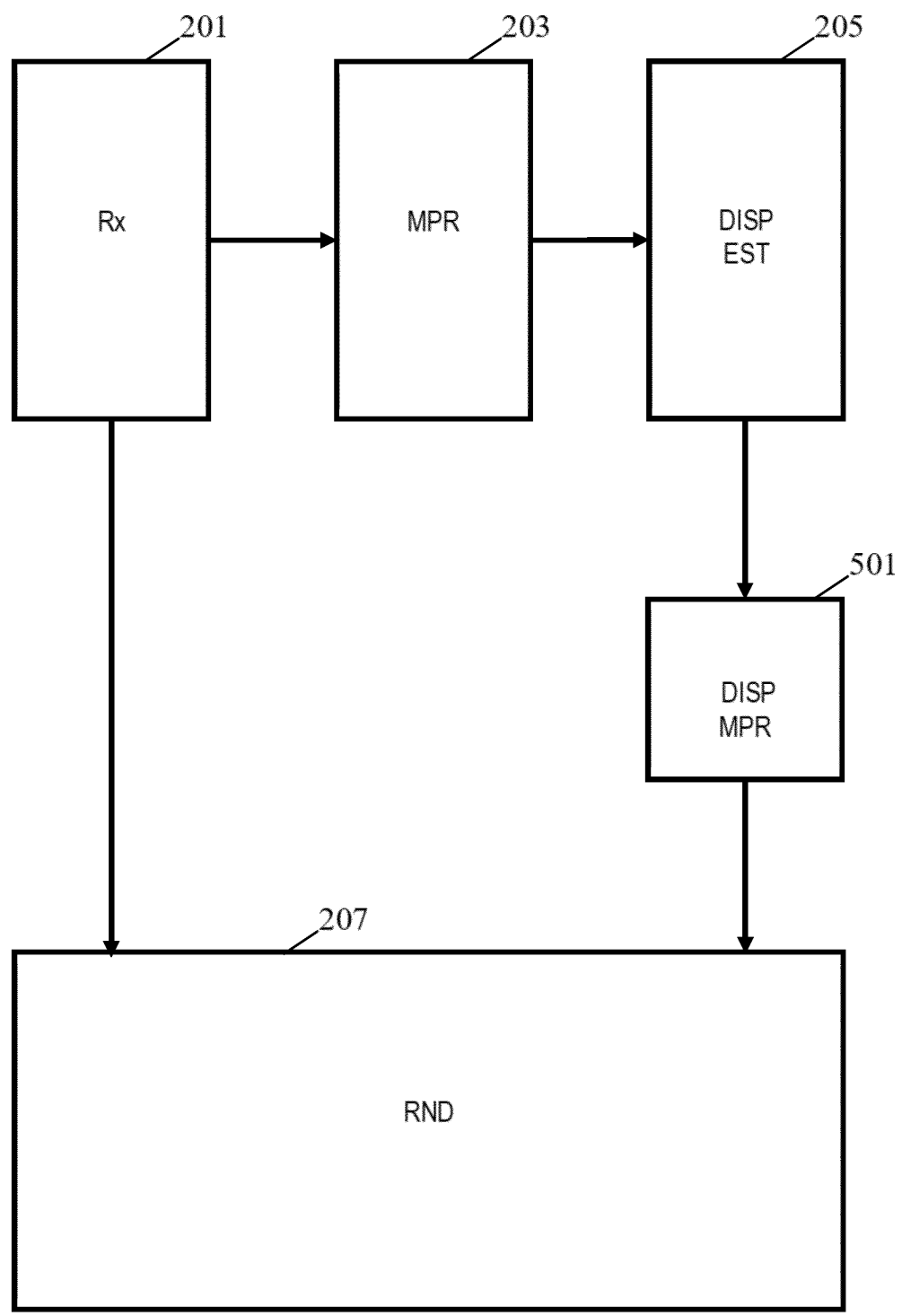
FIG. 5 illustrates an example of elements of an apparatus for generating disparity estimates in accordance with some embodiments of the invention.

For example, as illustrated in FIG. 5, the apparatus may comprise a disparity mapper 501 which is arranged to generate a set of disparities for the wide angle image by mapping the set of disparities determined from the modified image into the projection of the wide angle image. This is achieved by applying an inverse mapping of the mapping that was applied to the wide angle image to generate the modified image. Thus, following the disparity estimation, the disparity values may be kept in the coordinates of the modified image ($u_{trans}$, $v_{trans}$) or it may be transformed back to the coordinates of the input images (u, v).

As an example, equations (7) and (8) may be inverted such that coordinates (u, v) may be written as a function of coordinates ($u_{trans}$, $v_{trans}$) of the transformed image. Another approach is to just re-use the re-mapping table new map M' and numerically invert that to produce M".

In the example where the disparities are generated for the wide angle image, these may in some embodiments be provided to the renderer 207 together with the wide angle image and the renderer 207 may be arranged to synthesize images for different viewpoints based on the wide angle image and the associated disparities. The rendering algorithm may in this case take the distortion of the wide angle image into account by using the known camera intrinsics (focal length, distortion parameters) and extrinsics (rotation) parameters to perform rectification during mesh generation in OpenGL. This means that in a so called vertex shader, the image coordinate is first transformed to a rectified perspective image coordinate before it is combined with the sampled depth map value to calculate the 3D (x,y,z) scene coordinate. So essentially, the undistort/rectify operation becomes part of the texture mapping operation as implemented by the vertex and fragment shader of OpenGL.

Such an approach may be preferred in many scenarios as it allows the original (unfiltered) image to form the basis for the image synthesis/rendering.

Figure 6:
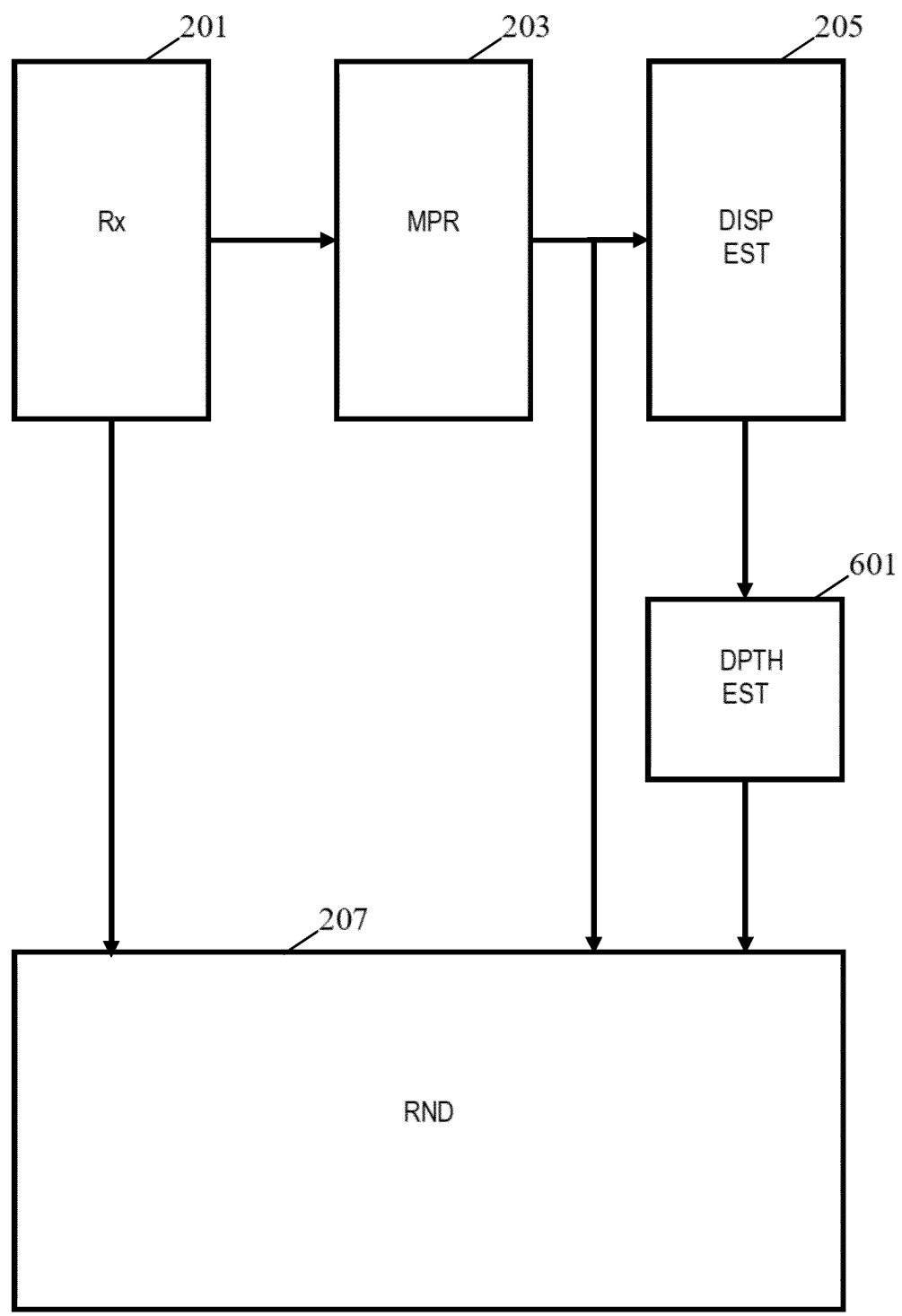
FIG. 6 illustrates an example of elements of an apparatus for generating disparity estimates in accordance with some embodiments of the invention.

In the above examples, the disparity estimation provided disparity values that were directly used by the renderer 207 when synthesizing one or more images. In some embodiments, such as e.g. in the example of FIG. 6, the apparatus may comprise a depth estimator 601 which is arranged to determine a set of depths for the modified image from the set of disparities. The depth estimator 601 may specifically determine a depth value for each of the disparity values.

However, in order to do so, the depth estimator 601 must take into account the mapping performed, and specifically the non-linear horizontal mapping. The non-linear horizontal mapping affects the relationship between image disparity/distance and real world disparity/distance and therefore impacts the relationship between the determined disparity and the real-world depth.

An approach for determining the depth may be based on considering the perspective projection equations to the coordinates in world space. This approach may consider the values (u, v) and D (u, v) in the case of the wide angle image or ($u_{trans}$, $v_{trans}$) and D ($u_{trans}$, $v_{trans}$) in case of the modified image, where the former indicates the position in the respective image and the latter represents the estimated image disparity in that image.

From these, it calculates the corresponding values ($u_{perspective}$, $v_{perspective}$) and $D_{perspective}$ ($u_{perspective}$, $v_{perspective}$) in the perspective projection. The disparity value in this projection, may be determined as the shift but now as it relates the two images but each according to the perspective projection. And for such an undistorted and rectified image pair there is a simple relation between observed disparity and depth. From the determined disparity in the perspective projection, the 3D (x,y,z) coordinate can be calculated using the sensor shift, focal length and baseline only. For instance, the OpenCV computer vision library provides the disparity to depth matrix that performs the mapping from image coordinate and disparity to x,y,z in homogeneous coordinates. The determined depth value can thus be stored as a function of coordinates (u, v) or ($u_{trans}$, $v_{trans}$) in the wide angle image or the modified image respectively. As long as we realize that the depth relates to the perspective projection and compensate for this during rendering.

In some embodiments, the mapper 203 may be arranged to divide the wide angle image into a plurality of image sections and then perform the mapping by applying a sub-mapping to each image section. In such a case, the specific sub-mapping in the different image sections will be different. Specifically, a mapping may be determined for the entire image, e.g. as previously described, and then the corresponding mapping to be performed in each image section may be determined and applied to that image section as a sub-mapping. Such an approach may be advantageous in many embodiments. In particular, it may facilitate or enable parallel processing to be used to implement the functionality of the mapper 203. This may in many embodiments allow a much faster operation, and may for example allow real time processing of wide angle images of a video stream (i.e. wide angle frames).

As a specific example, in many embodiments or scenarios, it may be advantageous to partition the wide angle image into tiles. Each tile may then be mapped separately, and indeed disparity estimation may be performed separately for each tile.

Figure 7:
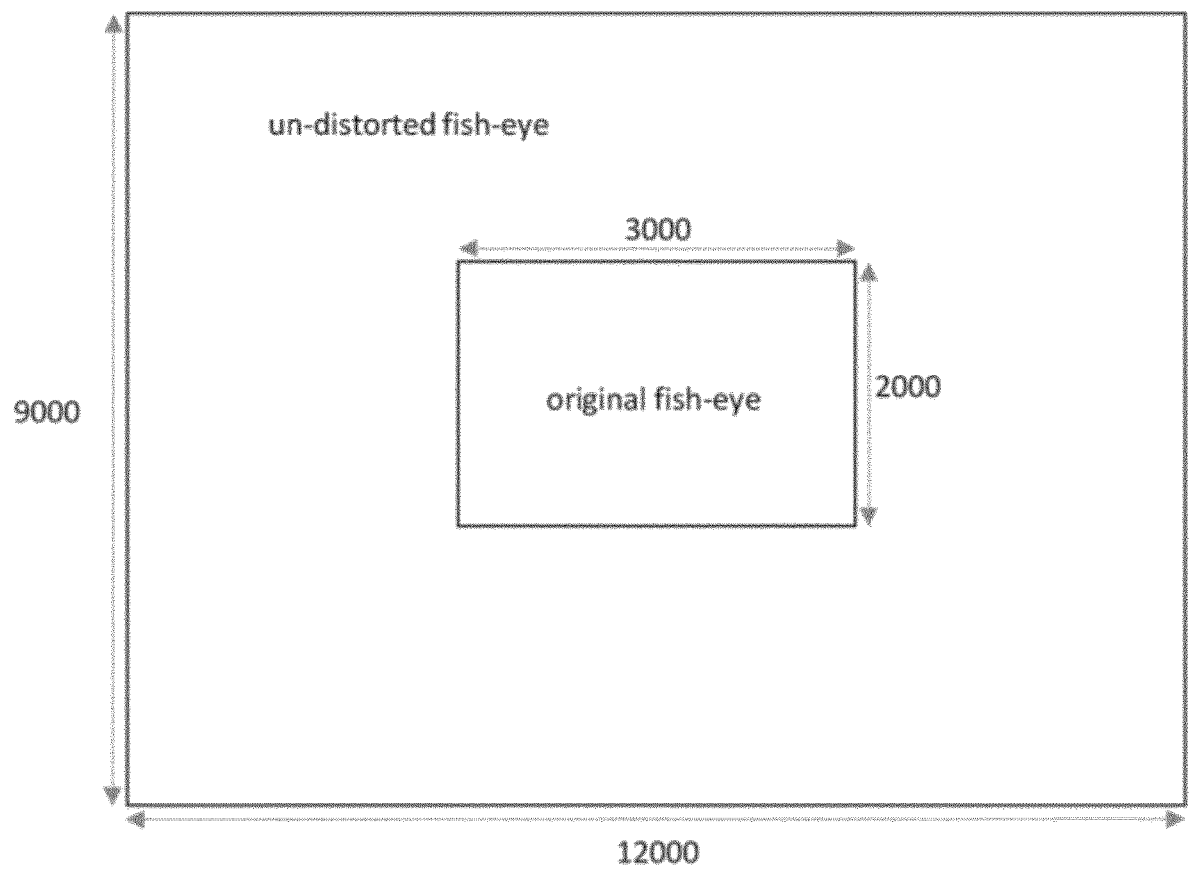
FIG. 7 illustrates an example of different representations of a wide angle image.
Figure 8:
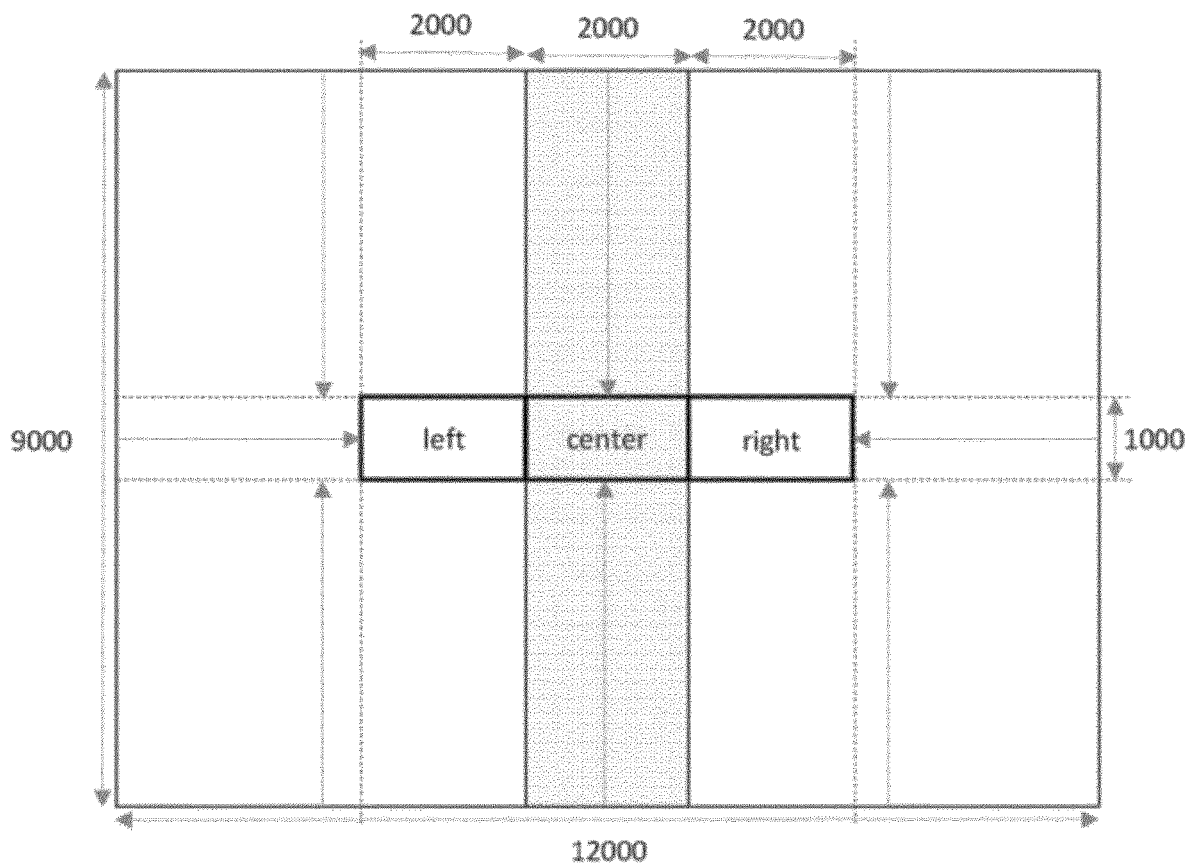
FIG. 8 illustrates an example of a tiling of a wide angle image being processed by the apparatus of FIG. 2.

FIG. 7 illustrates an example which illustrates the size [in pixels] of an input wide angle image relative to the size [in pixels] of an equivalent un-distorted perspective image. FIG. 8 illustrates a possible partitioning and non-linear scaling of the un-distorted image of FIG. 7 into three tiles. Each tile now measures 2000×1000 pixels, which is a suitable size for disparity estimation. It should be noted that the non-linear scaling differs for each tile.

The above has described exemplary embodiments with respect to a wide angle (fish eye) capture system In many such image capture systems, there are a number of coordinate systems and mappings.

Firstly, the real world being captured is represented by a real world coordinate system which is typically independent of the capture pose. A real world coordinate in which the real world is represented on the basis of the position and orientation of the camera is referred to as a camera coordinate system, i.e. the camera coordinate system reflects real world 3D coordinates based on the camera pose. Thus, the camera coordinate system can be considered to be a 3D real world coordinate system spatially synchronised with the pose of the capturing camera.

The capturing of the image projects the camera coordinate system to an image coordinate system, i.e. there is a transformation from 3D camera coordinates X, Y, Z (or represented by spherical coordinates) to 2D image coordinates (e.g. (u,v); (x*,y*)).

Different projections from the 3D camera coordinates to the 2D image coordinates are known. Popular ones include the equi-distant projection r=fθ and the perspective projection r=f tan(θ). These projections represent the projection from the three dimensions of the real world to the two dimensional plane.

The described approach is directed to a different mapping than such a projection from the real world to the 2D image plane, namely it introduces a mapping from one set of 2D image coordinates to another set of 2D image coordinates, i.e. the approach is related to a 2D to 2D mapping between two images. Specifically, the mapping is from the first wide angle image to the modified image, i.e. it is an image to image mapping and not a real world to image plane mapping (i.e. it is not a projection from the 3D real world to a captured image)

The term projection may typically refer to the projection of 3D (e.g. spherical) coordinates to 2D planar coordinates and/or to the projection from the scene/camera coordinate system to an image plane coordinate system. The term mapping may typically refer to mapping between image coordinate systems, and specifically the mapper 203 is arranged to map between two (planar) images. The mapper 203 performs a 2D mapping.

Further, this 2D mapping may comprise two sup-mappings.

The first is a sub-mapping from the 2D image coordinates (u,v) in the first wide angle image (typically the image captured by a wide-angle camera) to 2D image coordinates (Uperspective, Vperspective) of an intermediate image.

The second is a sub-mapping from the 2D image coordinates (Uperspective, Vperspective) of the intermediate image to the 2D image coordinates of a modified image (Utrans, Vtrans).

These (sub)mappings are all 2D mappings between 2D image coordinates. They map between different 2D image coordinate systems. They are not mappings from 3D real-world or camera coordinates to 2D image coordinates.

Of course, a projection inherently exists from a 3D scene to any 2D image capturing the 3D scene. The projection represents how the coordinates of the 3D scene (e.g. represented by a viewsphere) projects to coordinates in the image plane. Thus, each of the first wide angle image, the (potentially virtual) intermediate image, and the modified image inherently has a projection from the camera coordinates to the image coordinates (with the projection being different for the different images).

The projection from the 3D camera coordinates represented by the first wide angle image will depend on the specifics of the camera capturing the image. In the present case, the image is a wide angle image that has a projection where a vertical image position of a scene position depends on a horizontal distance from the scene position to an optical axis for the wide angle image. It is not an epipolar projection.

The specific projection will of course depend on the characteristics of the camera, including potentially distortions etc. The current approach does not rely on any specific projection being implemented by the camera or on the captured image having any specific projection.

The wide angle capture may be modelled by a suitable camera model. A common model for a fish eye lens is the an f-theta projection (see equation 2):

$$r = f\theta.$$

However, other models are possible. Indeed, in practice, the projection depends in detail on the specific properties of the lens. Often, the projection is modelled by a low complexity "idealised" model such as the equi-distant projection above together with an additional component that reflects distortions and inaccuracies of the lens etc. In some cases, these distortions can be ignored.

The first submapping transforms the 2D image coordinates (u,v) in the first wide angle image into 2D image coordinates (Uperspective, Vperspective) of the intermediate image. Consequentially, the first submapping will change the projection for the first wide angle image into a different projection for the intermediate image. Thus, the projection that exists between the camera coordinates and the 2D image coordinates (u,v) of the first wide angle image will change into a different projection that exists between the camera coordinates and the 2D image coordinates (Uperspective, Vperspective) of the intermediate image.

Indeed, in the described approach, the mapping is such that the intermediate image will have a perspective projection from the camera coordinates to the 2D image coordinates (Uperspective, Vperspective) of the intermediate image. Thus, the intermediate image represents a perspective projection of the 3D real-world camera coordinates onto the image plane.

The specific first sub-mapping that maps the 2D image coordinates (u,v) of the first wide angle image into the 2D image coordinates (Uperspective, Vperspective) of the intermediate image will depend on the projection from the 3D camera coordinate to the 2D image coordinates (u,v). The mapping will be such that the result of the mapping is an intermediate image that has a perspective projection. Thus, the mapping is selected such that it results in the 2D image coordinates (Uperspective, Vperspective) of the intermediate image that correspond to a perspective projection.

The projection for the first wide angle image (the first projection) will for a captured image depend on the characteristics of the capturing camera. If the projection performed by the camera is known, or assumed, then the mapping can be predetermined. For example, if it is assumed that the camera uses a fish eye lens resulting in a f-theta projection r=fθ, then the 2D to 2D image mapping used to achieve a perspective projection of the resulting (intermediate) image follows directly.

However, a particular advantage of the approach is that it provides an efficient way of adapting to specific cameras and capture projections. Specifically, complex algorithms are known which can search and adapt parameters of mappings from captured image coordinates into image coordinates corresponding to a perspective projection. Many such approaches utilize a model of the camera corresponding to an underlying ideal projection, such as an f-theta projection for a fish eye lens together with an adaptive non-linear mapping that is dynamically adapted to compensate for individual distortions and inaccuracies for the lens. This process is known as rectification and the current approach may in many embodiments benefit from being able to use such rectification algorithms.

However, as the Inventor has realized the perspective projection has disadvantages that are particularly critical for wide angle images such as fish eye images. The approach addresses this by applying the second sub-mapping which is a non-linear horizontal mapping from the perspective projection. This may result in an image which is suitable for disparity estimation and which does not have excessive storage requirements or require very resource intensive disparity estimation. Further, the mapping may be individual in the horizontal and vertical direction.

The invention can be implemented in any suitable form including hardware, software, firmware or any combination of these. The invention may optionally be implemented at least partly as computer software running on one or more data processors and/or digital signal processors. The elements and components of an embodiment of the invention may be physically, functionally and logically implemented in any suitable way. Indeed, the functionality may be implemented in a single unit, in a plurality of units or as part of other functional units. As such, the invention may be implemented in a single unit or may be physically and functionally distributed between different units, circuits and processors.

Although the present invention has been described in connection with some embodiments, it is not intended to be limited to the specific form set forth herein. Rather, the scope of the present invention is limited only by the accompanying claims. Additionally, although a feature may appear to be described in connection with particular embodiments, one skilled in the art would recognize that various features of the described embodiments may be combined in accordance with the invention. In the claims, the term comprising does not exclude the presence of other elements or steps.

Furthermore, although individually listed, a plurality of means, elements, circuits or method steps may be implemented by e.g. a single circuit, unit or processor. Additionally, although individual features may be included in different claims, these may possibly be advantageously combined, and the inclusion in different claims does not imply that a combination of features is not feasible and/or advantageous. Also the inclusion of a feature in one category of claims does not imply a limitation to this category but rather indicates that the feature is equally applicable to other claim categories as appropriate. Furthermore, the order of features in the claims do not imply any specific order in which the features must be worked and in particular the order of individual steps in a method claim does not imply that the steps must be performed in this order. Rather, the steps may be performed in any suitable order. In addition, singular references do not exclude a plurality. Thus, references to "a", "an", "first", "second" etc. do not preclude a plurality. Reference signs in the claims are provided merely as a clarifying example and shall not be construed as limiting the scope of the claims in any way.

The invention claimed is:

1. An apparatus comprising:
   a receiver circuit,
      wherein the receiver circuit is arranged to receive a first wide angle image,
      wherein the first wide angle image has a viewing angle of at least 90° and a first projection,
      wherein the first projection has a vertical image position of a scene position,
      wherein the first projection depends on a horizontal distance from the scene position to an optical axis for the first wide angle image;
   a mapper circuit,
      wherein the mapper circuit applies a mapping to the first wide angle image so as to generate a modified image,
      wherein the modified image has a modified projection,
      wherein the mapping provides a vertical mapping function,
         wherein the vertical mapping function is arranged to match a mapping from the first projection to a perspective projection,
         wherein the vertical mapping provides a non-linear vertical mapping from the perspective projection to a modified vertical projection of the modified projection,
      wherein the mapping provides a horizontal mapping function, wherein horizontal mapping function is arranged to match a mapping from the first projection to the perspective projection, wherein the vertical mapping provides a non-linear horizontal mapping from the perspective projection to a modified horizontal projection of the modified projection;

a disparity mapper circuit, wherein the disparity mapper circuit is arranged to generate a first set of disparities for the first wide angle image by mapping the first set of disparities to the first projection, wherein the mapping of the first of disparities to the first projection applies an inverse mapping of the mapping applied to the first wide angle image.

2. The apparatus of claim 1, wherein a mapping function of the non-linear vertical mapping is different from a mapping function of the non-linear horizontal mapping.

3. The apparatus of claim 2, wherein the mapping function of the non-linear vertical mapping is more compressed than the mapping function of the non-linear horizontal mapping.

4. The apparatus of claim 1, wherein the disparity mapper circuit is arranged to generate a second set of disparities for the modified image relative to a second image, wherein the second image represents a different view point than the first wide angle image.

5. The apparatus of claim 1, further comprising a depth estimator circuit, wherein the depth estimator circuit is arranged to determine a set of depths for the modified image in response to the first set of disparities and the non-linear horizontal mapping.

6. The apparatus of claim 1, wherein the mapper circuit is arranged to apply the mapping by applying a first mapping to the first wide angle image to generate an intermediate image, wherein the intermediate image has the perspective projection, wherein the mapper circuit is arranged to apply a second mapping to the intermediate image to generate the modified image.

7. The apparatus of claim 6, wherein the mapper circuit is arranged to perform rectification for the first wide angle image as part of the first mapping.

8. The apparatus of claim 1, wherein the mapper circuit is arranged to divide the first wide angle image into a plurality of image sections, wherein the mapper circuit is arranged to perform the mapping by applying a sub-mapping to each image section, wherein the sub-mapping for at least two of the plurality of image sections is different.

9. The apparatus of claim 1, wherein the mapper circuit is arranged to perform stereo rectification as part of the mapping, wherein the stereo rectification is relative to a second wide angle image.

10. The apparatus of claim 1, wherein the receiver circuit is arranged to receive a second wide angle image, wherein the second wide angle image is for a different view point than the first wide angle image, wherein the second wide angle image has a viewing angle of at least 90° and the first projection, wherein the mapper circuit is arranged to generate a second image by applying the mapping to the second wide angle image.

11. The apparatus of claim 10, wherein a scene position having different magnitudes of horizontal offset with respect to optical axes for the first wide angle image and the second wide angle image are projected to different vertical positions in the first wide angle image and the second wide angle image.

12. The apparatus of claim 11, wherein the mapping maps the different vertical positions in the first wide angle image and second wide angle image to a same vertical position in the modified image and the second image.

13. The apparatus of claim 1, wherein the non-linear horizontal mapping has a gradient that decreases with an increasing horizontal distance to a center of the first wide angle image.

14. A method of estimating disparity, the method comprising:

receiving a first wide angle image, wherein the first wide angle image has a viewing angle of at least 90° and a first projection, wherein the first projection has a vertical image position of a scene position, wherein the first projection depends on a horizontal distance from the scene position to an optical axis for the first wide angle image;

mapping to the first wide angle image so as to generate a modified image, wherein the modified image has a modified projection, wherein the mapping provides a vertical mapping function, wherein the vertical mapping function is arranged to match a mapping from the first projection to a perspective projection, wherein the vertical mapping function provides a non-linear vertical mapping from the perspective projection to a modified vertical projection of the modified projection, wherein the mapping provides a horizontal mapping function, wherein horizontal mapping function is arranged to match a mapping from the first projection to the perspective projection, wherein the horizontal mapping function provides a non-linear horizontal mapping from the perspective projection to a modified horizontal projection of the modified projection;

generating a second set of disparities for the modified image relative to a second image, wherein the second image represents a different view point than the first wide angle image; and generating a first set of disparities for the first wide angle image by mapping the first set of disparities to the first projection by applying an inverse mapping of the mapping applied to the first wide angle image.

15. A computer program stored on a non-transitory medium, wherein the computer program when executed on a processor performs the method as claimed in claim 14.

16. The method of claim 14, wherein a mapping function of the non-linear vertical mapping is different from a mapping function of the non-linear horizontal mapping.

17. The method of claim 16, wherein a mapping function of the non-linear vertical mapping is more compressed than a mapping function of the non-linear horizontal mapping.

18. The method of claim 14, wherein the second image represents the modified projection.

19. The method of claim 14, further comprising determining a set of depths for the modified image in response to the first set of disparities and the non-linear horizontal mapping.

20. The method of claim 14, further comprising:
mapping by applying a first mapping to the first wide angle image to generate an intermediate image; and
applying a second mapping to the intermediate image to generate the modified image, wherein the intermediation image has the perspective projection.

* * * * *